US011194539B2

(12) United States Patent
Mu

(10) Patent No.: US 11,194,539 B2
(45) Date of Patent: Dec. 7, 2021

(54) CONFERENCE SYSTEM, TOOL, AND PERIPHERAL DEVICES

(71) Applicants: Guangzhou Shiyuan Electronics Co., Ltd., Guangdong (CN); Guangzhou Shirui Electronics Co. Ltd., Guangdong (CN)

(72) Inventor: Yanxiong Mu, Guangdong (CN)

(73) Assignees: GUANGZHOU SHIYUAN ELECTRONICS CO., LTD., Guangdong (CN); GUANGZHOU SHIRUI ELECTRONICS CO. LTD., Guangdong (CN)

( * ) Notice: Subject to any disclaimer, the term of this patent is extended or adjusted under 35 U.S.C. 154(b) by 0 days.

(21) Appl. No.: 16/650,212

(22) PCT Filed: Mar. 18, 2019

(86) PCT No.: PCT/CN2019/078551
§ 371 (c)(1),
(2) Date: Mar. 24, 2020

(87) PCT Pub. No.: WO2019/179398
PCT Pub. Date: Sep. 26, 2019

(65) Prior Publication Data
US 2020/0272404 A1 Aug. 27, 2020

(30) Foreign Application Priority Data
Mar. 19, 2018 (CN) .......................... 201810226531.0

(51) Int. Cl.
G06F 3/14 (2006.01)
G06F 3/041 (2006.01)
(Continued)

(52) U.S. Cl.
CPC ........ *G06F 3/1454* (2013.01); *G06F 3/04162* (2019.05); *G06F 3/04883* (2013.01);
(Continued)

(58) Field of Classification Search
CPC ........... G09G 2370/20; G09G 2370/16; G09G 2340/02; G06F 3/04883; G06F 3/04162;
(Continued)

(56) References Cited

U.S. PATENT DOCUMENTS 8,390,467 B2    3/2013  Feldstein et al.
9,269,340 B2 *  2/2016  Udell, III ............. G10H 1/0091
(Continued)

FOREIGN PATENT DOCUMENTS

CN        1605070 A        4/2005
CN      101677391 A        3/2010
(Continued)

OTHER PUBLICATIONS

International Application No. PCT/CN2019/078551, International Search Report and Written Opinion dated Jun. 14, 2019, pp. 8.
(Continued)

*Primary Examiner* — Charles V Hicks
(74) *Attorney, Agent, or Firm* — Zhong Law, LLC

(57) ABSTRACT

A communication device includes USB Type-C (USB-C) port to receive a media data presented at a user computing device, a signal converter circuit to convert the media data into a formatted media data, a hardware processor, communicatively coupled to the signal converter and the USB-C port, to compress, according to an encoding scheme, the formatted media data into a compressed media data stream, and a wireless transmission interface to transmit, using a wireless network, the compressed media data stream to a large-format display device for presentation of the media data.

26 Claims, 5 Drawing Sheets

(51) Int. Cl.
  *G06F 3/0488* (2013.01)
  *G06F 13/42* (2006.01)
(52) U.S. Cl.
  CPC .. *G06F 13/4282* (2013.01); *G06F 2213/0016* (2013.01); *G06F 2213/0042* (2013.01)
(58) Field of Classification Search
  CPC ........... G06F 2213/0042; G06F 3/1454; G06F 13/4282; G06F 2213/0016; H04N 7/15
  See application file for complete search history.

(56) References Cited

U.S. PATENT DOCUMENTS

| | | | |
|---|---|---|---|
| 10,701,426 B1* | 6/2020 | van Hoff | G06F 3/012 |
| 2003/0072429 A1 | 4/2003 | Slobodin et al. | |
| 2006/0154693 A1 | 7/2006 | Kogan | |
| 2012/0051716 A1 | 3/2012 | Ku | |
| 2016/0156137 A1* | 6/2016 | Pan | G06F 13/385 439/78 |
| 2016/0217103 A1 | 7/2016 | Kim | |
| 2017/0152990 A1* | 6/2017 | Kielland | G03B 17/561 |
| 2017/0293347 A1* | 10/2017 | Wood, III | G06F 13/4282 |
| 2017/0302708 A1 | 10/2017 | Thomas et al. | |
| 2018/0131503 A1* | 5/2018 | Duan | G06F 13/40 |
| 2019/0042503 A1* | 2/2019 | Montero | G06F 13/4282 |

FOREIGN PATENT DOCUMENTS

| | | |
|---|---|---|
| CN | 201479301 U | 5/2010 |
| CN | 101742097 A | 6/2010 |
| CN | 102209230 A | 10/2011 |
| CN | 102566960 A | 7/2012 |
| CN | 202383657 U | 8/2012 |
| CN | 102724474 A | 10/2012 |
| CN | 103428561 A | 12/2013 |
| CN | 103595944 A | 2/2014 |
| CN | 105045548 A | 11/2015 |
| CN | 105262974 A | 1/2016 |
| CN | 105898547 A1 | 8/2016 |
| CN | 205486071 U | 8/2016 |
| CN | 107333082 A | 11/2017 |
| CN | 107479847 A | 12/2017 |
| CN | 108810448 A | 11/2018 |
| CN | 208298174 U | 12/2018 |
| KR | 1020040068123 A | 7/2004 |
| KR | 1020140106551 A | 9/2014 |
| KR | 1020160092310 A | 8/2016 |
| WO | 2016061683 A1 | 4/2016 |

OTHER PUBLICATIONS

Korean Application No. 10-2020-7015080, Korean Office Action dated Feb. 19, 2021, pp. 1-15.
Sadat et al., Texas Instruments, "Alternate Mode for USB Type-C: Going beyond USB," Oct. 2016, 9 pages.
Analogix, "MIPI to DP Trasmitters", Wayback Machine, Jun. 12, 2021, 1 page.
Australian Application No. 2019239357, Examination Report dated Jul. 27, 2021, 5 pages.

* cited by examiner

FIG. 2

| Pin | Signal | Signal | Pin |
|---|---|---|---|
| A1 | GND | GND | B12 |
| A2 | TX1+ | RX1+ | B11 |
| A3 | TX1− | RX1− | B10 |
| A4 | Vbus | Vbus | B9 |
| A5 | CC | SBU2 | B8 |
| A6 | D+ | D− | B7 |
| A7 | D− | D+ | B6 |
| A8 | SBU1 | VCONN | B5 |
| A9 | Vbus | Vbus | B4 |
| A10 | RX2− | TX2− | B3 |
| A11 | RX2+ | TX2+ | B2 |
| A12 | GND | GND | B1 |

200

CONFERENCE SYSTEM, TOOL, AND PERIPHERAL DEVICES

CROSS-REFERENCE TO RELATED APPLICATIONS

This application is a national stage of PCT/CN2019/078551 filed Mar. 18, 2019, which claims priority to Chinese application CN 201810226531.0 filed Mar. 19, 2018, the contents of which are hereby incorporated by reference in their entireties.

TECHNICAL FIELD

This disclosure relates to an intelligent conference system, and in particular to an intelligent conference system and, tool and peripheral devices associated with the intelligent conference system.

BACKGROUND

Existing technologies provide various solutions that can help participants of a conference communicate with each other. Exemplary solutions can include projecting the presentation content onto a big screen to share with the audience, communicating via remote instant communication, and displaying on a large-format display device (e.g., a large-format touch screen) that allows writing and drawing thereon. The large-format display device refers to devices that include a screen with the diagonal dimension larger than a certain length (e.g., larger than 32 inches). One more approach is to use wireless screen transmitter to transmit the screen image of a personal computer (PC) onto the large-format touch screen.

BRIEF DESCRIPTION OF THE DRAWINGS

The present disclosure is illustrated by way of example, and not by way of limitation, in the figures of the accompanying drawings.

FIG. 2 illustrates an exemplary 24-pin USB-C port 200.

DETAILED DESCRIPTION

Figure 1:
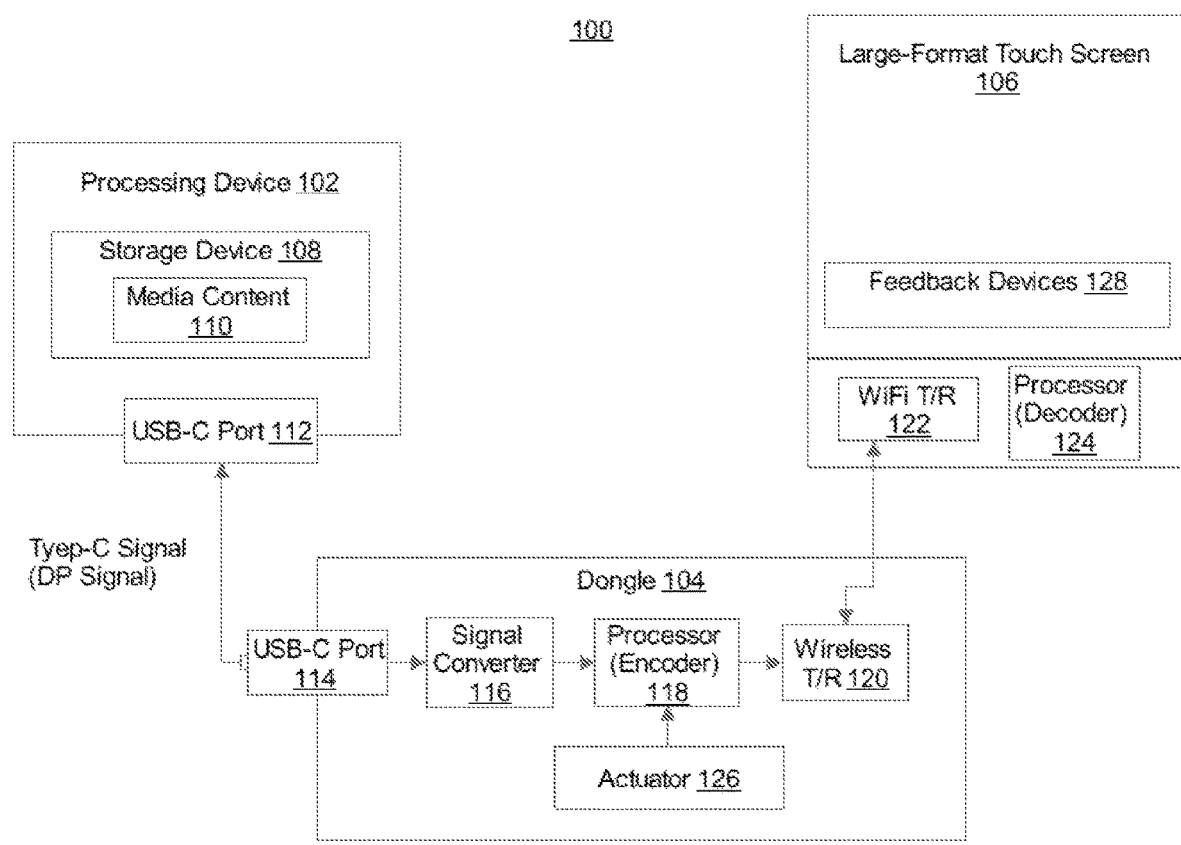
FIG. 1 illustrates a system for transmitting media content from a processing device onto a large-format touch screen according to an implementation of the present disclosure.

The wireless screen transmission may include the installation of a special-purpose program on a processing device (e.g., a personal computer, a tablet, or a smart phone), where the special-purpose program, when executed by the processing device, captures the screen images of the processing device at a constant frequency or at variable frequencies, encode and compress the captured screen images, and transmit, via a universal serial bus (USB) port, the compressed screen images to a peripheral device that is plugged into the USB port of the processing device. Upon receiving the compressed images, the peripheral device may include a wireless transmission device that may transmit the compressed screen images to the large-format display device for decoding and displaying. The current technology requires the installation of the special-purpose program on the processing device. In some implementations, the special-purpose program needs to be removed from the processing device after its usage. The installation and removal of the special-purpose program may take time and consume the resources of the processing device (e.g., the personal computer) of the user. For example, the installation of the special-purpose program may require the owner of the processing device to grant permission for the installation. Some owners may decline or be reluctant to grant the permission due to security concerns.

Implementations of the disclosure provide technical solutions that overcome the above-identified and other deficiencies of the current technology for transmitting screen images from a user computing device (e.g., a personal computer, a tablet, or a smart phone) to a large-format display device or a large-format touch screen. Implementations provide a class of peripheral devices as well as a conference system and tools that allow the transmission of the screen images from the user computing device to the large-format touch screen without the need to install a special-purpose program on the user computing device for the transmission of the screen images, thus reducing the preparation time and consuming no additional resources of the user computing device. Instead of installing the special-purpose program on the user computing device brought to the conference by a user, implementations of the disclosure may utilize existing drivers (e.g., those natively installed with the operating system) and ports on the user computing device to transmit screen images and associated audio signal to the peripheral device. The peripheral device may further include a converter circuit to convert the screen images and the associated audio data into a formatted media data, a hardware processor to compress the formatted media data into a compressed media data stream, and a transmitter to transmit compressed media data stream to the large-format touch screen. The peripheral device may have been provided in the conference room for visitors to use. The transmitter of the peripheral device may be a wireless transmitter that had been configured to communicate, using a wireless network associated with the conference room, with the large-format touch screen. In this way, the screen images can be transmitted to the large-format touch screen without the need to upload a special-purpose program from the peripheral device or install the program on the processing device. Any user may bring a user computing device to the conference and transmit media data from the user computing device to the large-format touch screen without altering the settings of the user computing device.

In one implementation, the port used for transmitting the screen images and audio signal is a Universal Serial Bus (USB) Type-C port that is available in user computing devices and mobile devices (e.g., personal computers, tablet computers, and smart phones). The USB Type-C port may include a 24-pin USB connector system that includes pins supporting the DisplayPort (DP) mode or any DP compatible modes. The USB Type-C port in the DisplayPort mode may transmit packetized data containing audio data and/or video data to display devices such as, for example, a video monitor. Thus, when a display device is connected to the user computing device through the USB Type-C, a DisplayPort driver already installed on the user computing device may support the transmission of media content (audio and/or video) to the display device for presentation. Under the DisplayPort mode, the USB-C port of a user computing device (e.g., a personal computer, a tablet, or a smart phone) may be used to transmit video and audio data to a peripheral device without requiring the installation of a special-purpose program on the user computing device because under the DisplayPort mode, the peripheral device is treated as an external display device that is capable of receiving and presenting the media content.

Implementations of the disclosure further provide a peripheral device (referred to as a dongle) that also includes a matching USB Type-C port. The USB Type-C port of the dongle may be coupled to the Type-C port of the user computing device using a USB Type-C cable. When connected with the dongle, the user computing device may receive a request from the dongle to set the Type-C port to operate in the DisplayPort mode and execute the DisplayPort driver to transmit data packets containing media contents from the user computing device to the dongle. Because the DisplayPort driver had been pre-installed on the user computing device with the operating system to accommodate different types of external display devices, there is no need to upload and install a special-purpose program for transmitting the video images.

To facilitate transmission of the media content to a large-format touch screen, in one implementation, the dongle may include a signal converter circuit to convert the media content in data packets specified according to the DisplayPort protocol received from the user computing device into formatted media data that are suitable for encoding and compression by a hardware processor. In one implementation, the signal converter may separate the media content into a video data stream and an audio data stream, thus treating the video data stream and audio data stream in two separate signal streams. The signal converter circuit may convert the video data stream extracted from the media content into a first video format such as, for example, a Mobil Industry Processor Interface (MIPI) formatted data, and convert the audio data stream extracted from the media content into a first audio format such as, for example, an Inter-IC Sound ($I^2S$) formatted data. The MIPI protocol is a protocol that used for point-to-point video transmission, and the $I^2S$ protocol is an electrical serial bus interface standard for connecting digital audio devices. The MIPI video data may contain a sequence of image frames including pixels represented in the YUV format; the $I^2S$ audio signal may be presented in the pulse-code modulation (PCM) format. Because the wireless network between the dongle and the large-format touch screen may have a limited bandwidth, both MIPI video data and the PCM audio data may need further compression before wirelessly transmitted from the dongle to the large-format touch screen. In another implementation, signal converter may include two converter circuits. The first converter circuit may convert the raw video data and raw audio data into a High-Definition Multimedia Interface (HDMI) media format. The second converter circuit may further convert the HDMI data into another HDTV standard (e.g., BT.1120/BT.656 of International Telecommunication Union). Such twice-formatted media data may be provided to the processor.

In one implementation, the dongle may further include a hardware processor (e.g., an ARM processor) that may be programmed to support a video/audio encoder to compress video data and audio data. The processor may encode the MIPI video data according to a video compression standard (e.g., H.264, H.265 etc.) and encode the $I^2S$ audio data according to an audio compression standard (e.g., the OPUS audio codec standard or the MP3 standard). The dongle may further include a first wireless transmitter/receiver that may transmit the encoded and compressed video data and audio data through a wireless network to a second wireless transmitter/receiver associated with the large-format touch screen. The wireless transmitter may include wireless network card that have been paired with a wireless network for communicating with a wireless receiver associated with the large-format touch screen. Because the first wireless transmitter/receiver of the dongle, the wireless network, and the second wireless transmitter/receiver of the large-format touch screen are paired in advance, the owner of the user computing device does not need to perform any network configuration on the user computing device, thus achieving a seamless and secure communication for the user computing device. Responsive to receiving the encoded media data, a processor associated with the large-format touch screen may execute a decoder program that may convert the compressed video data and compressed audio data into a format suitable for displaying on the screen. The large-format touch screen may then present the media content reconstructed from the video data and audio data on the large-format touch screen. In this way, the user of the user computing device may securely share media content from his/her user computing device to the large-format touch screen without uploading or installing a special-purpose program on the user computing device. All the user needs to do is to plug the dongle into the USB-C port of the user computing device and activate the dongle. Implementations of the disclosure significantly reduces the burden on the user and immunes the user computer device by eliminating the need to install a special-purpose program on the user computing device.

FIG. 1 illustrates a system 100 for transmitting media content from a processing device onto a large-format touch screen according to an implementation of the present disclosure. As shown in FIG. 1, system 100 may include a processing device 102, a dongle 104, and a large-format touch screen 106. Processing device 102 can be a suitable computing device used by a user. Examples of processing device 102 may include personal computers or mobile devices such as smart phones. A user may bring his/her processing device 102 to a conference or a classroom to present media content 110 onto large-format touch screen 106. In one implementation, processing device 102 may include a screen (not shown), a hardware processor (not shown), a storage device 108 for storing media content 110, and a USB-C port 112 for connecting to a peripheral device such as, for example, a monitor. The hardware processor may execute an operating system that manages operations of processing device 102 and provides drivers to communicate with peripheral devices. Storage device 108 can be a flash memory device, a hard disk, or a network storage accessible by processing device 102. Media content 110 can be a PowerPoint™ presentation (a PPT file), a video clip, or a stack of slices in the portable document format (pdf). The hardware processor may run an application program (e.g., Microsoft PowerPoint) that may convert the media contents into image data stored in an image buffer suitable to be displayed on the screen of the processing device 102.

Processing device 102 may also include a port for connection with peripheral devices. In one implementation, the port can be a universal serial bus (USB) Type-C (referred to as USB-C) port 112 for connecting to peripheral devices that support the USB-C specification. The USB can be USB 2.0, USB 3.0 or any USB standard that supports Type-C specification. The USB-C port 112 may include 24 physical pins specified according to the USB-C protocol.

FIG. 2 illustrates an exemplary 24-pin USB-C port 200. As shown in FIG. 2, USB-C port 200 may include 24 pins, including two parallel lines of rotationally-symmetrical pins, where the first line may include 12 pins identified as pins A1-A12, and the second line may include 12 pins identified as B1-B12 to support bi-directional plug-in. The pins may include ground return GND (A1, A12, B12, B1), first SuperSpeed differential pair TX+/TX− (A2/A3, B11/B10), bus power $V_{BUS}$ (A4, A9, B9, B4), configuration channel CC1, CC2 (A5, B5), USB 2.0 differential pair Dp1, Dn1 (A6/A7, B7/B6), secondary bus SBU (A8, B8), and second SuperSpeed differential pair RX−/RX+ (A10/A11, B3/B2).

In some versions of USB-C may support different modes including a DisplayPort (DP) mode. The DisplayPort mode is a digital display interface standard set by Video Electronics Standards Association (VESA). The DisplayPort mode primarily supports the connection of the USB-C port to a video source to a display device. Under the DisplayPort mode, the USB-C interface can transmit audio, USB, and other forms of data to the display device. In the context of this application, the video source may come from the image data in the video frame buffer of processing device 102. The video frame buffer is a type of memory that stores the images to be presented on a screen connected to processing device 102. Dongle 104 may act as a display device to processing device 102. In the DisplayPort mode, the USB-C port may rely on packetized data (referred to as packet data or packets) transmission where small data packets containing a small chunk of the media content data are transmitted from a source to a destination. The clock signal used to synchronize the media content data is embedded in the packet data stream. In the DisplayPort mode, the USB-C port interface may employ the one or two differential pairs (A2/A3, A10/A11, or B11/B10, B3/B2) to transmit DP video/audio data packets. In one implementation, a peripheral device (e.g., dongle 104) may use the configuration channel pin CC1, CC2 (A5, B5) to transmit a control signal to processing device 102. The control signal may set the one or two differential pairs to operate in the DisplayPort mode to transmit the video/audio data packets, thus enabling the peripheral device to communicate with processing device 102 using the video/audio drivers already installed on processing device 102 (e.g., already installed with the operating system as part of pre-installed software). The video/audio data carried by the DisplayPort data packets are not compressed and thus are ready for display without decoding. In this way, the one or two differential pairs of the USB-C port may be used to transmit screen data of processing device 102.

The bus power $V_{BUS}$ pin (A4, A9, B9, B4) may provide power supply from processing device 102 to the peripheral device (dongle 104). Thus, processing device 102 may supply a power signal using the $V_{Bus}$ pin to peripheral device. The peripheral device can operate without the need for an independent power source. USB 2.0 differential pair Dp1, Dn1(A6/A7, B7/B6) can be used to transmit other types of data information such as, for example, to transmit the touch gesture data captured by the large-format touch screen 106 as described in this disclosure.

Referring to FIG. 1, dongle 104 may include a corresponding USB-C port 114, a signal converter 116, a hardware processor 118, and wireless transmitter/receiver 120 (e.g., a WiFi transmitter/receiver). USB-C port 114 may include, as an integral part, a cable to provide a wired connection link between processing device 102 and dongle 104. At a first end of the cable, USB-C port 114 may include a USB-C connector including board to board connectors matched to the pins of USB-C port 112 of processing device 102. When the USB-C connector is plugged into USB-C port 112, the cable may connect USB-C port 112 of processing device 102 with USB-C port 114 for providing a wired data communication link. Through the two (or four) differential pairs of data channels and bus power pins, processing device 102 may transmit DisplayPort data packets and the power signal from processing device 102 to dongle 104. Further, through the configuration control and USB 2.0 differential pairs, dongle 104 may transmit control signals generated by hardware processor 118 and touch gesture data captured by large-format touch screen 106 to processing device 102. Dongle 104 may use control signals to request processing device 102 to set USB-C port 112 to run under the DisplayPort mode.

Signal converter 116 may include logic circuit that may receive the DisplayPort data from differential pairs of USB-C port 114 and convert the DisplayPort data to a video stream and an audio stream in formats that are suitable for further processing. The DisplayPort data may contain packets of uncompressed raw video/audio data. For example, the video data can include raster images of pixels, each pixel being represented by its luminance (Y) and chrominances (U, V) values. The audio data can include the audio data in the pulse-code modulation (PCM) format. The clock signal may be embedded in the stream of packet data. Both the video and audio data can be in the uncompressed formats.

Responsive to receiving the DisplayPort data, signal converter 116 may extract the raw video data from DP data packets and reformat the raw video data into a video stream in a first video format, and extract the raw audio data from the DP data packets and reformat the raw audio data into an audio stream in a first audio format, where the first video format and the first audio format may be designed for interfacing video/audio data between a processor and a peripheral device. In one implementation, signal converter 116 may reformat the raw video data into a Mobil Industry Processor Interface (MIPI) video format, and reformat the raw audio data into an Inter-IC Sound ($I^2S$) audio format. In another implementation, signal converter 116 may include two converter circuits. The first converter circuit may convert the raw video data and raw audio data into a High-Definition Multimedia Interface (HDMI) media format. The second converter circuit may further convert the HDMI data into another HDTV standard (e.g., BT.1120/BT.656 of International Telecommunication Union). Such twice-formatted media data may be provided to processor 118.

Signal converter 116 may further output the video stream and the audio stream to processor 118, where processor 118 may include encoder circuit to encode and compress the video stream and the audio stream for transmission over a wireless network to large-format touch screen 106. In one implementation, processor 118 can be a central processing unit (CPU) based on a reduced instruction set computer (RISC) architecture developed by Advanced RISC Machines (referred to as an ARM processor). The ARM processor may include image signal processing (ISP) pins to receive the video stream and the audio stream from signal converter 116. Responsive to receiving the video stream and the audio stream, processor 118 may execute the encoder to perform video compression and audio compression. In one implementation, processor 118 may perform H.264/H.265 video compression to generate a compressed video stream and to perform the audio compression (e.g., based on OPUS or MP3) to generate a compressed audio stream that is synchronized to the video stream through the clock signal. Both the compressed video stream and the compressed audio stream are much smaller than the corresponding video stream and audio stream prior to compression. Thus, the compressed video stream and the compressed audio stream are suitable for transmission over a wireless network which may have a limited bandwidth for data transmission.

Wireless transmitter/receiver 120 can be a wireless communication interface to receive the compressed video stream and the compressed audio stream and transmit the compressed video stream and the compressed audio stream over a wireless network. In one implementation, wireless transmitter/receiver 120 may include logic circuit to package the compressed video stream and the compressed audio stream into data packets and transmit the data packets over a WiFi communication network to large-format touch screen 106.

Large-format touch screen 106 may include a screen (e.g., a LED screen) to display the media content 110, where the display may mirror the screen display of processing device 102. In one implementation, in addition to the touch screen, large-format touch screen may include, or be associated with, a wireless transmitter/receiver 122 and a processor 124. Wireless transmitter/receiver 122 may receive, over the wireless network, data packets transmitted by wireless transmitter/receiver 120 of dongle 104. Further, wireless transmitter/receiver 122 may unpackage the data packet to reconstruct the compressed video stream and the compressed audio stream. Processor 124 may include decoder circuit to restore the uncompressed video stream from the compressed video stream, and to restore the uncompressed audio stream from the compressed audio stream. Processor 124 may further cause the video stream and the audio stream to be presented on the touch screen. Thus, implementations of the disclosure provide a technical solution that allows the transmission of media content 110 available on processing device 102 onto large-format touch screen 106 without the need to upload a special-purpose program from the dongle 104 and install the special-purpose program on processing device 102. In this way, the user of processing device 102 may be spared from the inconvenience and safety concerns of installing the special-purpose program. Further, the transmission of media content 110 to large-format touch screen 106 does not consume resources of processing device 102.

In one implementation, dongle 104 may further include an actuator 126 that controls when to start transmission of media content 110 to large-format touch screen 106. Actuator 126 can be a physical input device such as, for example, a push button that is connected to a switch device. Prior to activating the actuator 126, dongle 104 may discard the DisplayPort data packets received from processing device 102, thus reducing unnecessary encoding and storage of media data on dongle 104. Responsive to receiving an indication of activating the actuator 126 (e.g., pressing down the push button), dongle 104 may start to convert the DisplayPort data packets into a formatted video and audio data, encode and compress the video and audio data, and transmit the compressed video and audio data to large-format touch screen 106.

Large-format touch screen 106 may further include feedback device 128 that may detect user interactions with the touch screen 106. Feedback device 128 can be infrared sensors or capacitive sensors that may detect the gestures of a pointing object. For example, feedback device 128 of touch screen 106 may detect a user's gestures acted on the screen. The gestures can include one finger pointing to a point identified by a coordinate in a coordinate system, a tap to click with one finger, a tap with two fingers, a swipe of one finger on the screen, and zoom in or out with two fingers. Other types of feedback device 128 may include a keyboard and/or a mouse as an input device associated with large-format touch screen 106. Feedback devices 128 may capture user interactions with large-format touch screen 106, where the interactions may include coordinates of the touch points and their corresponding time stamps. Processor 124 may capture touch data associated with the interactions. The touch data may include the coordinates of the touch points on the touch screen. Processor 124 may further use wireless transmitter/receiver 122 to transmit the touch data to wireless transmitter/receiver 120 of dongle 104.

Responsive to receiving the touch data from wireless transmitter/receiver 120, processor 118 may run an emulator program to simulate a HID device to convert the touch data into Human Interface Device (HID) format. Processor 118 may transmit the HID data using the USB 2.0 differential pairs of USB-C port 114 to processing device 102. The processor of processing device 102 may simulate and present the user interactions with large-format touch screen 106 based on the HID data. For example, a mouse interaction with large-format touch screen 106 may be captured and transmitted as HID data through dongle 104 to processing device 102. The processor of processing device 102 may simulate the mouse actions and present the simulated mouse actions on the screen of processing device 102. Thus, implementations of the disclosure may provide bi-directional screen sharing and interactions between processing device 102 and large-format touch screen 106.

Figure 3:
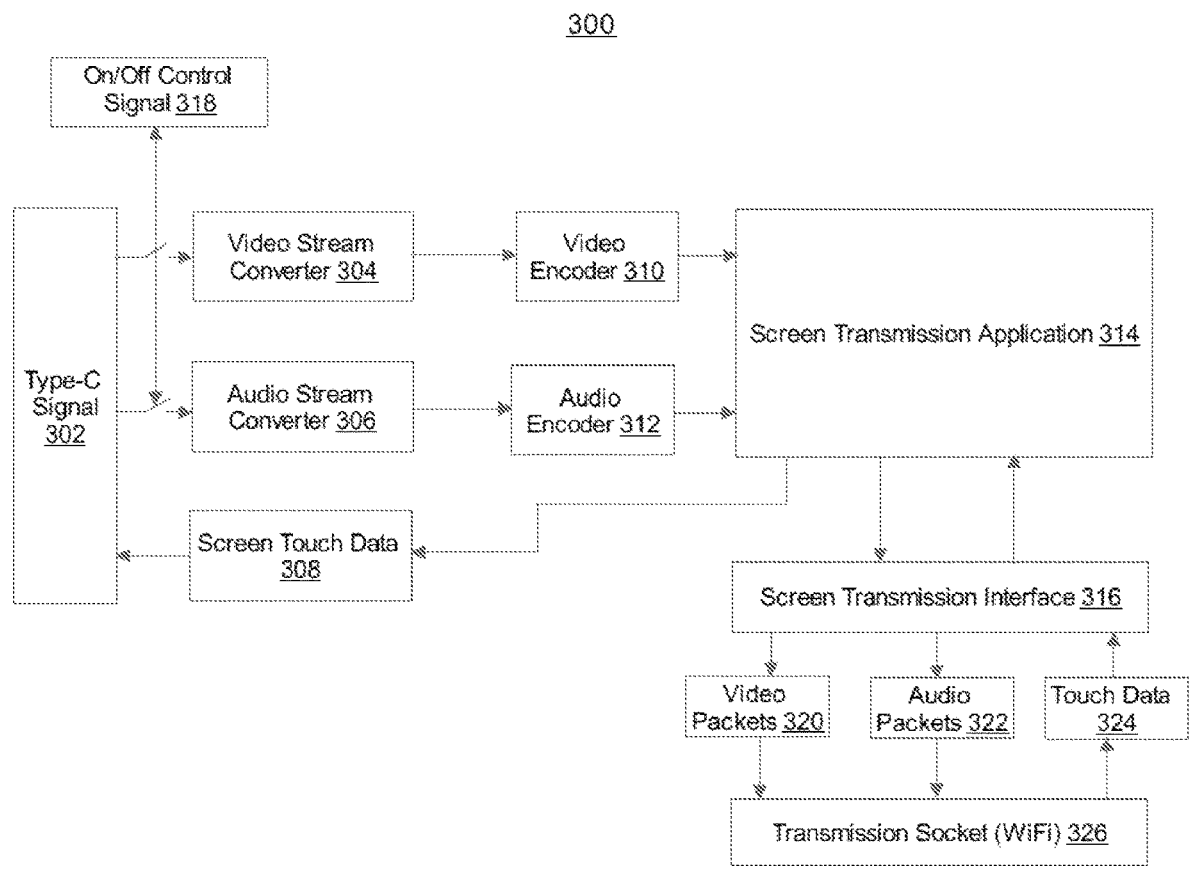
FIG. 3 illustrates a software platform implemented on a dongle for transmitting media content to a large-format touch screen according to an implementation of the disclosure.

FIG. 3 illustrates a software platform 300 implemented on a dongle for transmitting media content to a large-format touch screen according to an implementation of the disclosure. As shown in FIG. 3, software platform 300 may receive USB-C signal 302 from the USB-C port of the dongle. USB-C signal 302 may include DisplayPort data packets carrying the video and audio data of media contents from a user computing device such as, for example, a personal computer. An on/off control signal 318, generated by an actuator on the dongle, may control whether to initiate the transmission of the media content to the large-format touch screen. Prior to activating the actuator, the control signal 318 may indicate an OFF state. Any DisplayPort data packets received by the dongle may be discarded without further processing. Responsive to detecting that the actuator is activated and control signal 318 indicating ON, the signal converter circuit of the dongle may extract raw video data (e.g., YUV images) and raw audio data (e.g., PCM audio data) from the DisplayPort data packets. Further, the signal converter circuit may implement a video stream generator 304 that may convert the raw video data into a formatted video stream. In one implementation, the formatted video stream is in the MIPI format. The signal converter circuit may implement an audio stream generator 306 that may convert the raw audio data into a formatted audio stream. In one implementation, the formatted audio stream is in the I²S format.

The formatted video stream and audio stream may be provided to a hardware processor (e.g., an ARM processor) for encoding and compression. The hardware processor may implement a video encoder 310 (e.g., an H.264/H.265 encoder) that may encode the uncompressed video stream at the input into a compressed video stream (H.264/H.265 stream) at the output. Further, the hardware processor may implement an audio encoder 312 (e.g., an OPUS encoder or an MP3 encoder) that may encode the uncompressed audio stream at the input into a compressed audio stream (OPUS stream or MP3 stream) at the output. The compressed video and audio streams are much smaller than the uncompressed stream and are therefore more suitable for transmission over a wireless network to the large-format touch screen.

The hardware processor may further implement a screen transmission application 314 for packaging the compressed video and audio streams into data packets suitable for transmission over an Internet Protocol (IP) based network. The hardware processor may execute the screen transmission application 314 to transmit the data packets to a screen transmission interface 316. In one implementation, screen transmission interface 316 may include a wireless transmission card and an antenna to transmit the data packets in a WiFi network. The data packets may include video data packets 320 and audio data packets 322 that may be transmitted over the WiFi network to transmission socket (WiFi) 326 associated with a large-format touch screen. The large-format touch screen may restore the video and audio streams from the video data packets 320 and audio data packets 322 received by transmission socket (WiFi) 326 and display the video stream and audio stream on the screen.

The large-format touch screen may include a feedback device to capture user interactions with the touch screen, where the interactions may include coordinates of the touch points and their corresponding time stamps. A processor associated with the large-format touch screen may capture touch data including coordinates of touch points. The processor may use transmission socket (WiFi) 326 to transmit touch data 324 to screen transmission interface 316. Screen transmission interface 316 may reconstruct screen touch data 308 from touch data 324 and transmit screen touch data 308 through the USB-C port of the dongle to the user processing device. There, a processor of the user processing device may simulate the user interaction based on the screen touch data 308.

Figure 4:
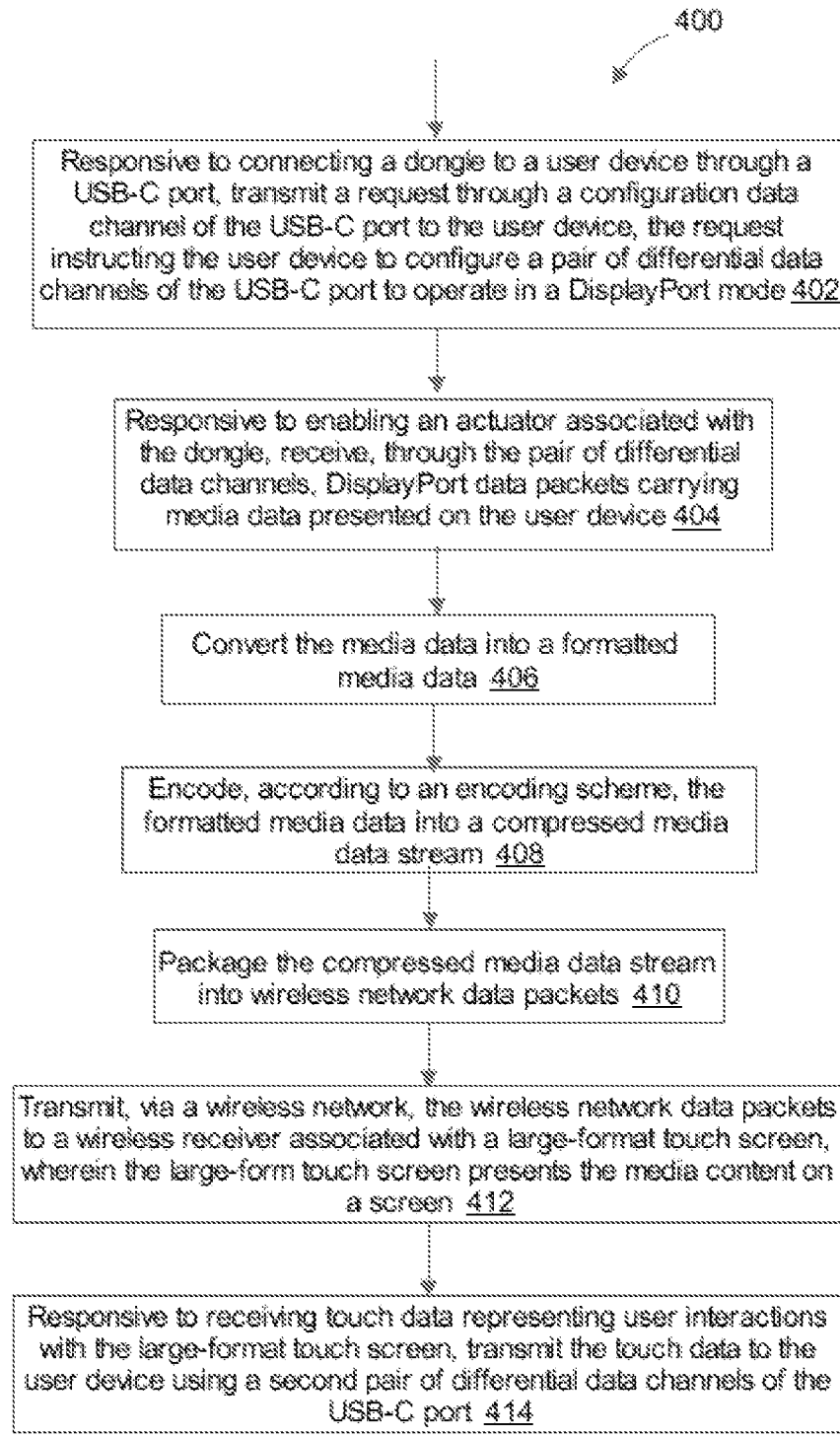
FIG. 4 is a flow diagram illustrating a method to operate a dongle for transmitting media content to a large-format touch screen according to some implementations of the disclosure.

FIG. 4 is a flow diagram illustrating a method 400 to operate a dongle for transmitting media content to a large-format touch screen according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the hardware processor 118 of dongle 104 as shown in FIG. 1.

Referring to FIG. 4, responsive to connecting the dongle to a user computing device (e.g., a personal computer or a smart phone) through a USB-C port, at 402, the hardware processor of the dongle may transmit a request through a configuration channel (e.g., the CC pin) of the USB-C port to the user computing device, the request instructing the user computing device to configure a pair of differential data channels of the USB-C port to operate in a DisplayPort mode.

Responsive to enabling an actuator associated with the dongle, at 404, the hardware processor may receive, through the pair of differential data channels, DisplayPort data packets carrying media data associated with media content presented on the user computing device, where the media data can include raw video or audio data and unformatted.

At 406, a signal converter circuit may convert the media data into a formatted media data (e.g., MIPI video format or I$^2$S audio format) that is suitable for further processing, where the formatted media data is also uncompressed.

At 408, the hardware processor may encode, according to an encoding scheme (e.g., H.264 or H.265), the formatted media data into a compressed media data stream that is suitable for wireless transmission.

At 410, the hardware processor may further package the compressed media data stream into wireless network data packets that are suitable for transmission over a wireless network (e.g., a WiFi network).

At 412, the hardware processor may transmit, via the wireless network, the wireless network data packets to a wireless receiver associated with a large-format touch screen, where a second processor associated with the large-format touch screen may restore the compressed video stream from the wireless network data packets, restore the formatted video stream from the compressed video stream, and present the video stream, as part of the media content, on the touch screen.

While the media content being presented on the large-format touch screen, a user (e.g., the content presenter) may interact with the content using a feedback device. The feedback device can include the touch sensors of the touch screen or an input device such as, for example, a computer mouse or a keyboard. The feedback device may detect parameters associated with the user interactions. The parameters may include coordinates of the user interactions on the touch screen and timestamps associated with these interactions. The second processor may capture the touch data and transmit these touch data to the dongle over the wireless network.

At 414, responsive to receiving the touch data packets (and the touch data) representing user interactions with the large-format touch screen, the hardware processor may transmit the touch data to the user computing device through a second pair (e.g., the Dn1/Dp1 pair) of differential data channels of the USB-C port.

At the user computing device, the processor of the user computing device may use the touch data to simulate and present the user interactions on a screen of the user computing device, thus achieving full two-way mirrored presentations between the user computing device and the large-format touch screen. Implementations of the disclosure may achieve the full two-way mirrored presentations without installing a special-purpose program on the user computing device, thereby eliminating the need for the user to spend time to configure the user computing device and consuming little resources of the user computing device.

Figure 5:
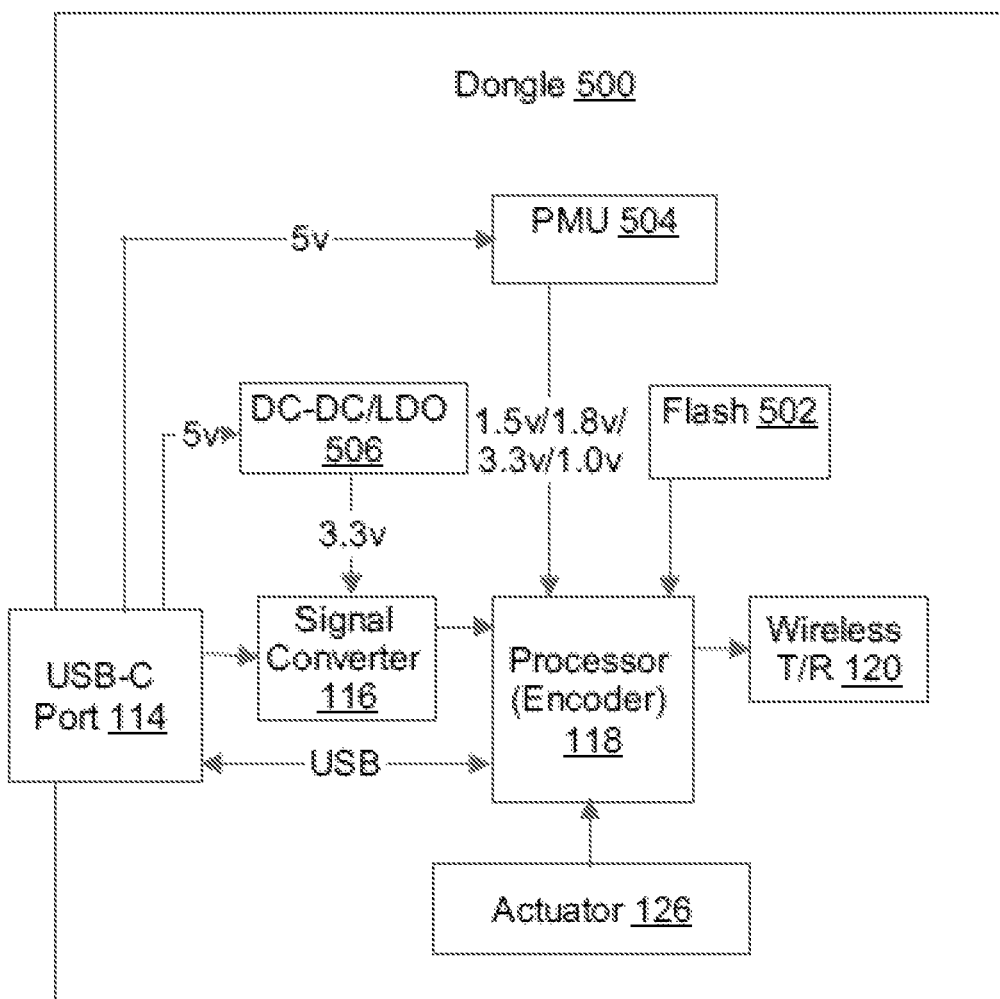
FIG. 5 illustrates a dongle according to another implementation of the present disclosure.

In one implementation, the dongle may further optionally include additional components to improve the functionality. FIG. 5 illustrates a dongle 500 according to another implementation of the disclosure, where dongle 500 may be coupled to processing device 102 as shown in FIG. 1. As shown in FIG. 5, dongle 500 may include those components of dongle 104 as shown in FIG. 1 and perform tasks as described in conjunction with FIG. 1. Dongle 500 may further include a storage device (e.g., a flash storage) 502, a power management unit (PMU) 504, and a power supply circuit 506 including a DC-DC converter and/or a low dropout regulator (LDO).

Storage device 502 can be used to store an executable program. The executable program can be uploaded to processing device 102 coupled to dongle 500. For example, the executable program may be uploaded to storage device 108, and processing device 102 may include a hardware processor to execute the uploaded executable program. In one implementation, the hardware processor of processing device 102 may execute the program to encode the media data presented on the screen associated with processing device 102 into USB 2.0 data, and then output the USB 2.0 data including the compressed media data through the corresponding pins of USB-C port 112 to dongle 500, thus allowing the transmission of the USB-2.0 data directly to the data pins of processor 118 (bypassing signal converter 116) for wireless transmission using wireless transmitter/receiver 120. This is useful as shown later when processing device supports only USB2.0 interface.

Because the executable program is stored in storage device 502 of dongle 500, it is convenient for processing device 102 to obtain the executable program. Specifically, processor 118, when activated, may obtain the executable program from storage device 502 and transmit the executable program through USB 2.0 differential pair of USB-C port 114 to processing device 102. As discussed in FIG. 1, processor 118 may be programmed with an encoder to encode the media data received from USB 2.0 data pins and transmit the encoded media data to wireless transmitter/receiver 120 for further transmission to the large-format touch screen via the wireless network.

It is noted that the interface of processing device 102 coupled to USB-C 114 can be a USB-C type interface such as USB-C port 112 as shown in FIG. 1. Alternatively, the interface of processing device 102 can include only USB2.0 or USB3.0 pins. When the interface is a USB-C port, dongle 500 may be coupled to processing device 102 directly and use the pair of differential data channel to receive DisplayPort data packets and use the USB2.0 pins to transmit other data between processing device 102 and dongle 500. In this situation, there is no need to upload the executable program to processing device 102. When the interface of processing device 102 does not support the USB-C port but only support a USB2.0 or USB3.0 port, USB-C port 114 may be coupled to a USB-C to USB2.0 (or USB3.0) adapter so that the dongle 500 may still be coupled to processing device 102. In this situation, processing device 102 may download the executable program from storage device 502 of dongle 500. The hardware processor in processing device may execute the executable program to encode the media data to be presented on the screen associated with processing device 102 into USB 2.0 (or USB3.0) data format. Processing device 102 may further transmit the USB 2.0 (or USB 3.0) data to dongle 500. Thus, dongle 500 may be compatible with both processing devices with USB-C port and processing devices with USB2.0/3.0 port.

In one preferred implementation, storage device 502 can be a flash storage device which is a non-volatile storage device that can store and preserve data for a long time without electric current supply similar to a hard drive. Thus, the flash storage device is much suitable for a mobile device such as dongle 500 to store the executable program for a long time.

As shown in FIG. 2, type-C port may further include electric power pin $V_{bus}$ that can be connected to the power supply pin of processor 118 to supply power to processor 118, thus dongle 500 does not need a power circuit which may further reduce the size of dongle 500 and improve the mobility of dongle 500.

In one implementation, processor 118 may include multiple power supply pins to receive power of different voltages while the $V_{bus}$ can only provide a specific voltage (e.g., 5v). Implementations of dongle 500 may further include a power management unit 504 that may convert $V_{bus}$ (5v) to multiple voltages (e.g., 1.5V, 1.8V, 3.3V, or 1V). Power management unit 504 can be a power solution of a highly-integrated circuit designed for mobile devices. Power management unit 504 may perform the functions of several discrete power units in a single enclosed unit, thus achieving high efficiency in power conversions, low power losses, and compact size due to fewer components. Power management unit 504 can be arranged between USB-C port 114 and processor 118, where the outputs of power management unit 504 are correspondingly connected to the power supply pins of processor 118. Because processor 118 may execute different programs to perform different tasks that may require different power supplies and/or temporal sequencing of power supplies, power management unit 504 may generate different voltages of power supplies for processor 118 and even control the temporal sequencing of these power supplies to meet the diverse requirements of processor 118.

Dongle 500 may further include a DC-DC/low dropout regulator (LDO) 506 to convert $V_{bus}$ from USB-C port 114 for signal converter 116. In one implementation, the conversion is from 5v of $V_{bus}$ to 3.3v for the power supply pin of signal converter 116.

In this way, implementations of this disclosure provide a dongle that may receive DisplayPort data packets through a USB-C port of a user device. The DisplayPort data packets may carry video and audio data presented on the user computing device. Thus, the user device without further configuration may treat the dongle as a peripheral display device to output DisplayPort data packets. The dongle may further convert the DisplayPort data packets into compressed video and audio stream, and transmit the video and audio data through a paired wireless network to a large-format display device. The dongle may also receive user interaction data from the large-format display device and transmit the user interaction data back to the user computing device. Thus, implementations provide a technical solution that, without modifying the user computer device, allow a full two-way mirrored screen transmission between the user computing device and the large-format display device. Implementations may provide a safe and easy conference environment for the user computing device because no special-purpose program is installed on the user computing device.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "transmitting", "receiving", "determining", "encoding", "packaging," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A communication device serving as an intermediate device for converting and transmitting data between two devices, comprising:
   a USB Type-C (USB-C) port operating in a DisplayPort mode through a first pair of differential data channels therein to receive raw media data captured by a driver natively provided in an operating system of a user computing device coupled to the communication device through the USB-C port, wherein the raw media data is unformatted, and the raw media data comprises at least one of a video data or an audio data;
   an actuator;
   a signal converter circuit to convert the unformatted raw media data into a formatted media data responsive to receiving an activation of the actuator;
   a hardware processor, communicatively coupled to the signal converter and the USB-C port, to compress, according to an encoding scheme, the formatted media data into a compressed media data stream; and
   a wireless transmission interface to transmit, using a wireless network, the compressed media data stream to a large-format display device for presentation of the media data.

2. The communication device of claim 1, wherein the communication device is a dongle for connecting the user computing device to the large-format display device, and wherein the user computing device is one of a personal computer, a tablet computer, or a smart phone, and wherein the large-format display device is a large-format touch screen.

3. The communication device of claim 1,
   wherein the actuator is to receive a user activation to start converting the media data into the formatted media data, and
   wherein prior to the user activation, the communication device is to discard the media data.

4. The communication device of claim 1, further comprising a USB-C cable for coupling to a USB-C port of the user computing device.

5. The communication device of claim 4, wherein responsive to detecting that the communication device is coupled to the user computing device, the hardware processor is to transmit, using a configuration channel of the USB-C port, a request to the user computing device to configure the first pair of differential data channels to operate in a DisplayPort mode.

6. The communication device of claim 5, wherein responsive to configuring the first pair of differential data channels to operate in the DisplayPort mode, the user computing device is to transmit the media data stored in a storage of the user computing device to the communication device.

7. The communication device of claim 1, wherein the formatted media data comprises at least one of a Mobil Industry Processor Interface (MIPI) video data or an Inter-IC Sound (I²S) signal, and wherein the compressed media data stream comprises at least one of a H.265/H.264 video stream or an MP3 audio stream.

8. The communication device of claim 1, wherein the large-format display device comprises:

a feedback device to capture parameter data associated with user interactions with a touch screen of the large-format display device; and
a second wireless transmission interface to transmit the captured parameter data to the communication device.

9. The communication device of claim 8, wherein responsive to receiving the parameter data, the hardware processor is to provide the parameter data to transmit, using a second pair of differential channels of the USB-C port, the parameter data to the user computing device, and wherein the user computing device is to simulate the user interaction.

10. The communication device of claim 8, wherein the feedback device comprises at least one of a touch sensor to capture a coordinate of a user gesture, a computer mouse, or a keyboard.

11. The system of claim 1, further comprising:
a storage device to store an executable program to be uploaded to the user computing device and executed by a processor of the user processing device; and
a power management unit to convert a first power supply at a first voltage received from the USB-C port to one or more second power supplies at second voltages to the hardware processor.

12. A method for operating a communication device that serves as an intermediate device for converting and transmitting data between two devices, the method comprising:
responsive to identifying a connection to a user computing device via a USB Type-C (USB-C) port, transmitting, by a hardware processor using a configuration channel of the USB-C port, a request to the user computing device, the request instructing the user computing device to configure a first pair of differential data channels of the USB-C port to operate in a DisplayPort mode;
responsive to determining that an actuator is in an enabled state, receiving, through the first pair of differential data channels, DisplayPort data packets carrying raw media data captured by a driver natively provided in an operating system of the user computing device, wherein the raw media data comprises at least one of a video data or an audio data;
converting the unformatted raw media data into a formatted media data;
encoding, according to an encoding scheme, the formatted media data into a compressed media data stream;
transmitting, using a wireless network, the compressed media data stream to a large-format display device for presentation of the media data; and
responsive to receiving touch data representing user interactions with the large-format touch screen, transmitting the touch data to the user computing device using a second pair of differential data channel of the USB-C port.

13. The method of claim 12, wherein the user computing device is one of a personal computer, a tablet computer, or a smart phone.

14. The method of claim 12, further comprising:
responsive to determining that the actuator is in a disabled state, discarding the DisplayPort data packets.

15. The method of claim 12, wherein responsive to configuring the first pair of differential data channels to operate in the DisplayPort mode, the user computing device is to transmit the media data stored in a storage of the user computing device to the first pair of differential data channels of the USB-C port.

16. The method of claim 12, wherein the formatted media data comprises at least one of a Mobil Industry Processor Interface (MIPI) video data or an Inter-IC Sound ($I^2S$) signal, and wherein the compressed media data stream comprises at least one of a H.265/H.264 video stream or an MP3 audio stream.

17. The method of claim 12, wherein the large-format touch screen is to capture the touch data associated with user interactions with a screen of the large-format touch screen, wherein the touch data comprise a coordinate of a user gesture pointing at the screen.

18. The method of claim 12, wherein responsive to receiving the touch data through the second pair of differential data channel of the USB-C port, a second hardware processor of the user computing device is to simulate, on the user computing device, the user interactions with the large-format touch screen.

19. A non-transitory machine-readable storage medium storing instructions which, when executed, cause a hardware processor to operate a communication device that serves as an intermediate device for converting and transmitting data between two devices, the hardware processor to:
responsive to identifying a connection to a user computing device via a USB Type-C (USB-C) port, transmit, a request using a configuration channel of the USB-C port to the user computing device, the request instructing the user computing device to configure a first pair of differential data channels of the USB-C port to operate in a DisplayPort mode;
responsive to determining that an actuator is in an enabled state, receive, through the first pair of differential data channels, DisplayPort data packets carrying raw media data captured by a driver natively provided in an operating system of the user computing device, wherein the media data comprises at least one of a video data or an audio data;
convert the unformatted raw media data into a formatted media data;
encode, according to an encoding scheme, the formatted media data into a compressed media data stream;
transmit, using a wireless network, the compressed media data stream to a large-format display device for presentation of the media data; and
responsive to receiving touch data representing user interactions with the large-format touch screen, transmit the touch data to the user computing device using a second pair of differential data channel of the USB-C port.

20. The non-transitory machine-readable storage medium of claim 19, wherein responsive to determining that the actuator is in a disabled state, the hardware processor is further to discard the DisplayPort data packets.

21. A system comprising:
a large-format display device; and
a peripheral device connected to the large-format display device through a wireless network, the peripheral device comprising:
a USB Type-C (USB-C) port operating in a DisplayPort mode through a first pair of differential data channels therein to receive raw media data captured by a driver natively provided in an operating system of a user computing device, wherein the raw media data is unformatted, and the raw media data comprises at least one of a video data or an audio data;
an actuator;
a signal converter circuit to convert the unformatted raw media data into a formatted media data responsive to receiving an activation of the actuator;
a hardware processor, communicatively coupled to the signal converter and the USB-C port, the hardware processor to compress, according to an encoding scheme, the formatted media data into a compressed media data stream; and a wireless transmission interface to transmit, using a wireless network, the compressed media data stream to a large-format display device for presentation of the media data.

22. The system of claim 21, wherein the peripheral device is a dongle made for connecting the user computing device to the large-format display device, and wherein the user computing device is one of a personal computer, a tablet computer, or a smart phone, and wherein the large-format display device is a large-format touch screen.

23. The system of claim 21,
wherein prior to the user activation, the peripheral device is to discard the media data.

24. The system of claim 21, wherein the peripheral device further comprises a USB-C cable for coupling to a USB-C port of the user computing device.

25. The system of claim 24, wherein responsive to detecting that the communication device is coupled to the user computing device, the hardware processor is to transmit, using a configuration channel of the USB-C port, a request to the user computing device to configure the first pair of differential data channels to operate in a DisplayPort mode.

26. The system of claim 21, wherein the large-format display device comprises:
a feedback device to capture parameter data associated with user interactions with a touch screen of the large-format display device; and
a second wireless transmission interface to transmit the captured parameter data to the peripheral device.

* * * * *